United States Patent
Walton et al.

(10) Patent No.: US 11,015,416 B2
(45) Date of Patent: May 25, 2021

(54) WELLBORE ISOLATION DEVICES WITH DEGRADABLE SLIP ASSEMBLIES WITH SLIP INSERTS

(71) Applicant: Halliburton Energy Services, Inc., Houston, TX (US)

(72) Inventors: Zachary William Walton, Carrollton, TX (US); Michael Linley Fripp, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/206,778

(22) Filed: Nov. 30, 2018

(65) Prior Publication Data
US 2019/0093450 A1    Mar. 28, 2019

Related U.S. Application Data

(63) Continuation of application No. 14/781,936, filed on Oct. 2, 2015, now Pat. No. 10,174,578, which is a
(Continued)

(51) Int. Cl.
*E21B 33/129* (2006.01)
*E21B 33/12* (2006.01)
(Continued)

(52) U.S. Cl.
CPC .......... *E21B 33/1293* (2013.01); *C09K 8/426* (2013.01); *C09K 8/428* (2013.01);
(Continued)

(58) Field of Classification Search
CPC ......... C22C 21/00; C22C 23/02; C22C 23/04; E21B 33/12; E21B 33/1293;
(Continued)

(56) References Cited

U.S. PATENT DOCUMENTS

| | | | |
|---|---|---|---|
| 4,655,852 | A | 4/1987 | Rallis |
| 5,984,007 | A | 11/1999 | Yuan et al. |

(Continued)

FOREIGN PATENT DOCUMENTS

| | | |
|---|---|---|
| CA | 2886988 C | 8/2017 |
| WO | 2005090742 A1 | 9/2005 |

(Continued)

OTHER PUBLICATIONS

Canadian Office Action from Canadian Patent Application No. 2,955,922; dated Dec. 8, 2017; 3 pages.
(Continued)

*Primary Examiner* — James G Sayre
(74) *Attorney, Agent, or Firm* — McGuireWoods LLP (57) ABSTRACT

Downhole tools including a wellbore isolation device that provides a plurality of components including a mandrel, and a slip assembly comprising a plurality of slip elements including a slip wedge and a slip, wherein an element of the slip assembly is composed of a degradable metal material, and wherein the slip comprises a slip insert embedded therein, the slip insert having a compressive strength of greater than about 120,000 psi.

41 Claims, 2 Drawing Sheets

Related U.S. Application Data continuation-in-part of application No. PCT/US2014/053212, filed as application No. PCT/US2015/038607 on Jun. 30, 2015.

(51) Int. Cl.
- *C22C 23/02* (2006.01)
- *C22C 23/04* (2006.01)
- *E21B 33/13* (2006.01)
- *E21B 43/26* (2006.01)
- *C09K 8/42* (2006.01)
- *C22C 21/00* (2006.01)
- *E21B 33/134* (2006.01)

(52) U.S. Cl.
CPC .............. *C22C 21/00* (2013.01); *C22C 23/02* (2013.01); *C22C 23/04* (2013.01); *E21B 33/12* (2013.01); *E21B 33/1294* (2013.01); *E21B 33/13* (2013.01); *E21B 33/134* (2013.01); *E21B 43/26* (2013.01)

(58) Field of Classification Search
CPC .... E21B 33/1294; E21B 33/13; E21B 33/134; E21B 43/26; E21B 29/00; E21B 34/063; E21B 31/002
See application file for complete search history.

(56) References Cited

U.S. PATENT DOCUMENTS

| | | | |
|---|---|---|---|
| 7,168,494 B2 | 1/2007 | Starr et al. | |
| 7,350,582 B2 | 4/2008 | McKeachnie et al. | |
| 7,353,879 B2 | 4/2008 | Todd et al. | |
| 7,690,436 B2 | 4/2010 | Turley et al. | |
| 8,211,248 B2 | 7/2012 | Marya | |
| 8,267,177 B1 | 9/2012 | Vogel et al. | |
| 8,413,727 B2 | 4/2013 | Holmes | |
| 8,573,295 B2 | 11/2013 | Johnson et al. | |
| 8,695,714 B2 | 4/2014 | Xu | |
| 8,746,342 B1 | 6/2014 | Nish et al. | |
| 8,905,147 B2 | 12/2014 | Fripp et al. | |
| 9,010,411 B1 | 4/2015 | Van Lue | |
| 9,016,363 B2 | 4/2015 | Xu et al. | |
| 9,217,319 B2 | 12/2015 | Frazier et al. | |
| 9,309,744 B2 | 4/2016 | Frazier | |
| 10,174,578 B2* | 1/2019 | Walton .................... E21B 33/12 | |
| 2005/0205265 A1 | 9/2005 | Todd | |
| 2006/0131031 A1 | 6/2006 | McKeachnie | |
| 2006/0278405 A1 | 12/2006 | Turley | |
| 2007/0074873 A1 | 4/2007 | McKeachnie et al. | |
| 2007/0181224 A1 | 8/2007 | Marya et al. | |
| 2007/0222106 A1 | 9/2007 | Brown | |
| 2008/0149345 A1 | 6/2008 | Marya et al. | |
| 2009/0101352 A1* | 4/2009 | Coronado ............. E21B 34/063 166/373 | |
| 2010/0270031 A1 | 10/2010 | Patel | |
| 2011/0048743 A1 | 3/2011 | Stafford et al. | |
| 2011/0067889 A1 | 3/2011 | Marya et al. | |
| 2011/0132621 A1 | 6/2011 | Agrawal et al. | |
| 2012/0097384 A1 | 4/2012 | Valencia et al. | |
| 2012/0125642 A1 | 5/2012 | Chenault | |
| 2012/0292053 A1 | 11/2012 | Xu | |
| 2012/0318513 A1 | 12/2012 | Mazyar et al. | |
| 2013/0043041 A1* | 2/2013 | McCoy .................... E21B 34/14 166/373 |
| 2013/0048305 A1 | 2/2013 | Xu | |
| 2013/0112429 A1 | 5/2013 | Crews | |
| 2013/0213665 A1 | 8/2013 | O'Malley | |
| 2013/0240200 A1 | 9/2013 | Frazier | |
| 2013/0292123 A1 | 11/2013 | Murphree | |
| 2013/0327540 A1 | 12/2013 | Hamid et al. | |
| 2014/0027128 A1 | 1/2014 | Johnson et al. | |
| 2014/0190685 A1* | 7/2014 | Frazier ................ E21B 33/1208 166/250.01 |
| 2014/0190705 A1 | 7/2014 | Fripp et al. | |
| 2014/0224477 A1 | 8/2014 | Wiese et al. | |
| 2014/0262327 A1 | 9/2014 | Xu | |
| 2014/0305627 A1 | 10/2014 | Manke | |
| 2015/0053428 A1 | 2/2015 | Xu | |
| 2015/0060085 A1 | 3/2015 | Xu | |
| 2015/0068728 A1* | 3/2015 | Stage .................. E21B 33/1293 166/134 |
| 2015/0247376 A1 | 9/2015 | Tolman | |
| 2015/0285026 A1* | 10/2015 | Frazier ................ E21B 33/1291 166/120 |
| 2015/0354311 A1 | 12/2015 | Okura et al. | |
| 2016/0201427 A1 | 7/2016 | Fripp et al. | |
| 2016/0230498 A1 | 8/2016 | Walton et al. | |
| 2016/0251934 A1 | 9/2016 | Walton et al. | |
| 2016/0290092 A1 | 10/2016 | Doane et al. | |
| 2016/0298412 A1 | 10/2016 | Fripp et al. | |
| 2016/0312111 A1 | 10/2016 | Okura | |
| 2017/0030161 A1 | 2/2017 | Frazier | |
| 2017/0349747 A1 | 12/2017 | Sherman | |

FOREIGN PATENT DOCUMENTS

| | | |
|---|---|---|
| WO | 2013109287 A1 | 7/2013 |
| WO | 2014100141 A2 | 6/2014 |
| WO | 2015171126 A1 | 11/2015 |
| WO | 2016032493 A1 | 3/2016 |
| WO | 2016032620 A1 | 3/2016 |
| WO | 2016032621 A1 | 3/2016 |
| WO | 2016032761 A1 | 3/2016 |

OTHER PUBLICATIONS

Australian Examination Report from Australian Patent Application No. 2015307211; dated Feb. 5, 2018; 5 pages.

International Search Report and Written Opinion for PCT/US2015/038624 dated Sep. 18, 2015.

Ginger Gardiner, "Composites Boon from Hydraulic Fracturing?" CompositesWorld, Jan. 8, 2014, XP055267997, obtained from http://www.compositesworld.com/blog/post/composites-boon-from-hydraulic-fracturing.

Search Report received in corresponding Netherlands Application No. 1041449; dated May 17, 2016.

International Search Report and Written Opinion for PCT/US2015/038607 dated Sep. 18, 2015.

* cited by examiner

WELLBORE ISOLATION DEVICES WITH DEGRADABLE SLIP ASSEMBLIES WITH SLIP INSERTS

CROSS-REFERENCE TO RELATED APPLICATIONS

This application is a Continuation of U.S. patent application Ser. No. 14/781,936 filed on Oct. 2, 2015, which is a 371 of international application PCT/US2015/038607 filed Jun. 30, 2015, which claims priority to PCT/US2014/053212 filed on Aug. 28, 2014 and entitled "Degradable Wellbore Isolation Devices with Large Flow Areas."

BACKGROUND

The present disclosure generally relates to downhole tools used in the oil and gas industry and, more particularly, to wellbore isolation devices having slip assemblies made of degrading materials and having slip inserts.

In the drilling, completion, and stimulation of hydrocarbon-producing wells, a variety of downhole tools are used. For example, it is often desirable to seal portions of a wellbore, such as during fracturing operations when various fluids and slurries are pumped from the surface into a casing string that lines the wellbore, and forced out into a surrounding subterranean formation through the casing string. It thus becomes necessary to seal the wellbore and thereby provide zonal isolation at the location of the desired subterranean formation. Wellbore isolation devices, such as packers, bridge plugs, and fracturing plugs (i.e., "frac" plugs), are designed for these general purposes and are well known in the art of producing hydrocarbons, such as oil and gas. Such wellbore isolation devices may be used in direct contact with the formation face of the wellbore, with a casing string extended and secured within the wellbore, or with a screen or wire mesh.

After the desired downhole operation is complete, the seal formed by the wellbore isolation device must be broken and the tool itself removed from the wellbore. Removing the wellbore isolation device may allow hydrocarbon production operations to commence without being hindered by the presence of the downhole tool. Removing wellbore isolation devices, however, is traditionally accomplished by a complex retrieval operation that involves milling or drilling out a portion of the wellbore isolation device, and subsequently mechanically retrieving its remaining portions. To accomplish this, a tool string having a mill or drill bit attached to its distal end is introduced into the wellbore and conveyed to the wellbore isolation device to mill or drill out the wellbore isolation device. After drilling out the wellbore isolation device, the remaining portions of the wellbore isolation device may be grasped onto and retrieved back to the surface with the tool string for disposal. As can be appreciated, this retrieval operation can be a costly and time-consuming process.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure generally relates to downhole tools used in the oil and gas industry and, more particularly, to wellbore isolation devices having slip assemblies made of degrading materials and having slip inserts.

The present disclosure describes embodiments of wellbore isolation devices that are made of degrading materials, and in particular having dissolving slip assemblies having slip inserts (also referred to as "buttons"). As used herein, the term "slip assembly," and grammatical variants thereof, refers to an assembly forming part of a downhole tool (e.g., a wellbore isolation device) comprising at least one or more slip wedges and one or more slips. The slips forming a portion of the slip assembly may further comprise slip inserts therein. The slip wedges may have any variety of configurations, including a plurality of slip wedges, where the slip wedges have an outer surface that will engage the inner surface of the slips of the slip assembly. The slips are then radially expanded to contact a surface (e.g., casing, tubing string, the wall of the wellbore, and the like) and maintain the tool at a particular location within a wellbore. The term "slips," and grammatical variants thereof (e.g., "slip") refers to any gripping device functioning to maintain a tool at a particular location within a wellbore. The slip assembly may further comprise other elements such as one or more latching mechanisms, such as part of the spacer ring 214 of FIG. 2 below. These "latching mechanisms" serve to hold all or a portion of the slip assembly against the mandrel and prevent further movement. Collectively, each of the slips (having slip inserts), slip wedges, and latching mechanisms of the slip assembly may be collectively referred to herein as "slip elements." The term "wellbore isolation device," and grammatical variants thereof, refers to a downhole tool placed in a wellbore capable of permanently or temporarily isolating at least a portion of the wellbore.

Slips forming part of the slip assemblies described herein as part of a downhole tool are initially retained in close proximity to a mandrel (or body), described in detail below, and then forced outwardly away from the mandrel upon the tool being set to engage a surface. The outward movement of the slips engage the surface such that the downhole tool does not move relative to the surface when a downhole operation is performed (e.g., stimulation of the wellbore). A slip insert may be partially embedded in a slip of a slip assembly to enhance the ability of the slip to engage a desired surface downhole. That is, the partially embedded slip insert comprises a portion that protrudes from the slip. The slip insert is of sufficient hardness to at least partially penetrate, or "bite" into, the particular surface that the slip is engaging (e.g., casing, tubing string, wellbore wall, and the like). Often, the surface that the slip is engaging is a metal, such as steel.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, businessrelated, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressed in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

Traditional components of a slip assembly are made of iron (e.g., cast iron) or another non-degradable material. The embodiments of the present disclosure are directed toward degradable downhole tools comprising degradable metal slip assemblies comprising slip inserts. As used herein, the term "degradable" and all of its grammatical variants (e.g., "degrade," "degradation," "degrading," "dissolve," "dissolving," and the like), refers to the dissolution or chemical conversion of solid materials such that reduced-mass solid end products by at least one of solubilization, hydrolytic degradation, biologically formed entities (e.g., bacteria or enzymes), chemical reactions (including electrochemical and galvanic reactions), thermal reactions, reactions induced by radiation, or combinations thereof. In complete degradation, no solid end products result. In some instances, the degradation of the material may be sufficient for the mechanical properties of the material to be reduced to a point that the material no longer maintains its integrity and, in essence, falls apart or sloughs off into its surroundings. The conditions for degradation are generally wellbore conditions where an external stimulus may be used to initiate or effect the rate of degradation, where the external stimulus is naturally occurring in the wellbore (e.g., pressure, temperature) or introduced into the wellbore (e.g., fluids, chemicals). For example, the pH of the fluid that interacts with the material may be changed by introduction of an acid or a base. The term "wellbore environment" includes both naturally occurring wellbore environments and materials or fluids introduced into the wellbore.

The degradable metal materials described herein may allow for time between setting a downhole tool (e.g., a wellbore isolation device) and when a particular downhole operation is undertaken, such as a hydraulic fracturing treatment operation. Moreover, degradable metal materials allow for acid treatments and acidified stimulation of a wellbore. In some embodiments, the degradable metal materials may require a large flow area or flow capacity to enable production operations without unreasonably impeding or obstructing fluid flow while the downhole tool degrades. As a result, production operations may be efficiently undertaken while the downhole tool degrades and without creating significant pressure restrictions.

Figure 1:
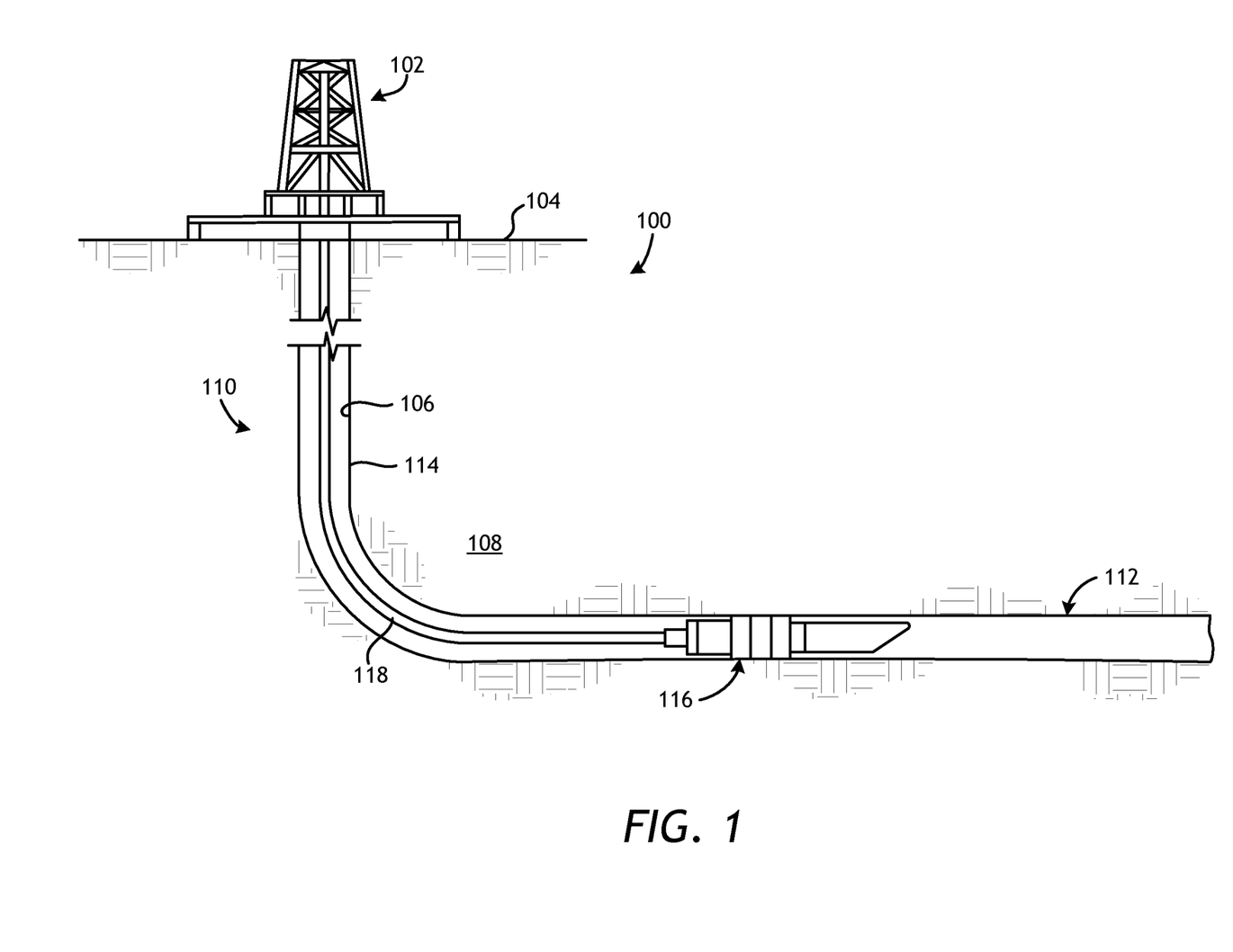
FIG. 1 is a well system that can employ one or more principles of the present disclosure, according to one or more embodiments.

Referring to FIG. 1, illustrated is a well system 100 that may embody or otherwise employ one or more principles of the present disclosure, according to one or more embodiments. As illustrated, the well system 100 may include a service rig 102 (also referred to as a "derrick") that is positioned on the earth's surface 104 and extends over and around a wellbore 106 that penetrates a subterranean formation 108. The service rig 102 may be a drilling rig, a completion rig, a workover rig, or the like. In some embodiments, the service rig 102 may be omitted and replaced with a standard surface wellhead completion or installation, without departing from the scope of the disclosure. While the well system 100 is depicted as a land-based operation, it will be appreciated that the principles of the present disclosure could equally be applied in any sea-based or sub-sea application where the service rig 102 may be a floating platform or sub-surface wellhead installation, as generally known in the art.

The wellbore 106 may be drilled into the subterranean formation 108 using any suitable drilling technique and may extend in a substantially vertical direction away from the earth's surface 104 over a vertical wellbore portion 110. At some point in the wellbore 106, the vertical wellbore portion 110 may deviate from vertical relative to the earth's surface 104 and transition into a substantially horizontal wellbore portion 112, although such deviation is not required. That is, the wellbore 106 may be vertical, horizontal, or deviated, without departing from the scope of the present disclosure. In some embodiments, the wellbore 106 may be completed by cementing a string of casing 114 within the wellbore 106 along all or a portion thereof. As used herein, the term "casing" refers not only to casing as generally known in the art, but also to borehole liner, which comprises tubular sections coupled end to end but not extending to a surface location. In other embodiments, however, the string of casing 114 may be omitted from all or a portion of the wellbore 106 and the principles of the present disclosure may equally apply to an "open-hole" environment.

The well system 100 may further include a downhole tool 116 that may be conveyed into the wellbore 106 on a conveyance 118 (also referred to as a "tool string") that extends from the service rig 102. The downhole tool 116 may be a wellbore isolation device, including or otherwise comprising any type of casing or borehole isolation device known to those skilled in the art including, but not limited to, a frac plug, a deployable baffle, a wellbore packer, or any combination thereof. The conveyance 118 that delivers the downhole tool 116 downhole may be, but is not limited to, wireline, slickline, an electric line, coiled tubing, drill pipe, production tubing, or the like.

The downhole tool 116 may be conveyed downhole to a target location (not shown) within the wellbore 106. The downhole tool 116 may be a wellbore isolation device that is actuated or "set" to seal the wellbore 106 and otherwise provide a point of fluid isolation within the wellbore 106. In some embodiments, the downhole tool 116 is pumped to the target location using hydraulic pressure applied from the service rig 102 at the surface 104. In such embodiments, the conveyance 118 serves to maintain control of the downhole tool 116 as it traverses the wellbore 106 and provides the necessary power when the downhole tool 116 is a wellbore isolation device to actuate and set it upon reaching the target location. In other embodiments, the downhole tool 116 freely falls to the target location under the force of gravity to traverse all or part of the wellbore 106.

It will be appreciated by those skilled in the art that even though FIG. 1 depicts the downhole tool 116 as being arranged and operating in the horizontal portion 112 of the wellbore 106, the embodiments described herein are equally applicable for use in portions of the wellbore 106 that are vertical, deviated, or otherwise slanted. It should also be noted that a plurality of downhole tools 116 may be placed in the wellbore 106. In some embodiments, for example, two or several (e.g., three or more) downhole tools 116 may be arranged in the wellbore 106 to divide the wellbore 106 into smaller intervals or "zones" for a particular operation (e.g., hydraulic stimulation).

Figure 2:
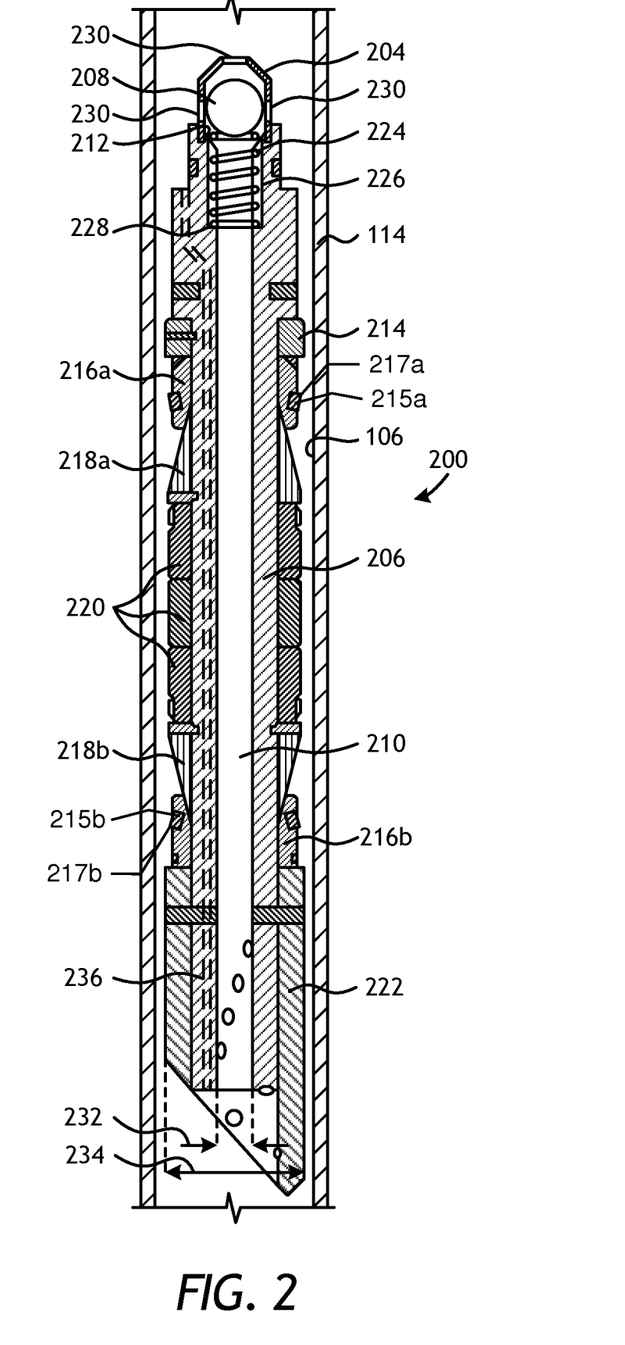
FIG. 2 is a cross-sectional side view of an exemplary frac plug that can employ the principles of the present disclosure.

Referring now to FIG. 2, with continued reference to FIG. 1, illustrated is a cross-sectional view of an exemplary downhole tool, wellbore isolation device 200. Wellbore isolation device 200 that may employ one or more of the principles of the present disclosure, according to one or more embodiments. The wellbore isolation device 200 may be similar to or the same as the downhole tool 116 of FIG. 1. The wellbore isolation device 200 may be configured to be extended into and seal the wellbore 106 at a target location, and thereby prevent fluid flow past the wellbore isolation device 200 for wellbore completion or stimulation operations. In some embodiments, as illustrated, the wellbore 106 may be lined with the casing 114 or another type of wellbore liner or tubing string in which the wellbore isolation device 200 may suitably be set. In other embodiments, however, the casing 114 may be omitted and the wellbore isolation device 200 may instead be set or otherwise deployed in an uncompleted or "open-hole" environment.

The wellbore isolation device 200 is generally depicted and described herein as a hydraulic fracturing plug or "frac" plug. It will be appreciated by those skilled in the art, however, that the principles of this disclosure may equally apply to any of the other aforementioned types of casing or borehole isolation devices, without departing from the scope of the disclosure. Indeed, the wellbore isolation device 200 may be any of a frac plug, a wellbore packer, a deployable baffle, a bridge plug, or any combination thereof in keeping with the principles of the present disclosure.

As illustrated, the wellbore isolation device 200 may include a ball cage 204 extending from or otherwise coupled to the upper end of a mandrel 206. A sealing or "frac" ball 208 is disposed in the ball cage 204 and the mandrel 206 defines a longitudinal central flow passage 210. The mandrel 206 also defines a ball seat 212 at its upper end. In other embodiments, the ball 208 may be dropped into the conveyance 118 (FIG. 1) to land on top of the wellbore isolation device 200 rather than being carried within the ball cage 204.

One or more spacer rings 214 (one shown) may be secured to the mandrel 206 and otherwise extend thereabout. The spacer ring 214 provides an abutment, which axially retains a set of upper slips 216*a* that are also positioned circumferentially about the mandrel 206. As illustrated, a set of lower slips 216*b* may be arranged distally from the upper slips 216*a*. The upper slips 216*a* have slip inserts 215*a* embedded therein; and the lower slips 216*b* have slip inserts 215*b* embedded therein. As used herein, the term "embedded" means at least partially enclosed within a supporting substance material. Accordingly, the slip inserts 215*a*, 215*b* are embedded, i.e., at least partially enclosed with the supporting upper and lower slips 216*a*, 216*b*, respectively. The slip inserts 215*a*, 215*b* may be embedded in the slips 216*a*, 216*b*, respectively, by any known method. Examples of suitable methods may include, but are not limited to, via a press fit, via a thermal shrink fit, via an adhesive, via a snap ring, via a swellable elastomer, and the like.

The slip inserts 215*a*, 215*b* described herein, in an embodiment, have in the range of about 10% to about 95% of their structure below the surface, including surface coating(s), of the slips 216*a*, 216*b*, encompassing any value and subset therebetween. For example, the slip inserts 215*a*, 215*b* may have about 30% to about 80% of their structure below the surface of the slips 216*a*, 216*b*, or about 45% to about 80% of their structure below the surface of the slips 216*a*, 216*b*, encompassing any value and subset therebetween. Accordingly, in an embodiment, the slip inserts 215*a*, 215*b* have in the range of about 5% to about 90% of their structure above the surface, including surface coating(s), of the slips 216*a*, 216*b*; or about 20% to about 60% of their structure above the surface of the slips 216*a*, 216*b*; or about 20% to about 55% of their structure above the surface of the slips 216*a*, 216*b*, encompassing any value or subset therebetween. As used herein, the term "surface" with reference to the slips 216*a*, 216*b*, refers to the outer surface or uppermost layer thereof, including any surface coatings applied thereof.

As a specific example of the slip inserts 215*a*, 215*b* being embedded in the slips 216*a*, 216*b*, as shown in FIG. 2, the slip inserts 215*a*, 215*b* have a leading edge 217*a*, 217*b* respectively that extends outward or protrudes beyond the surface of the body of the slip 216*a*, 216*b*, respectively. The leading edge 217*a*, 217*b* contacts a surface to hold the wellbore isolation device 200 at a location within a wellbore. The leading edge 217*a*, 217*b* protrudes beyond the body of the slip 216*a*, 216*b* away from the tip of the slip 216*a*, 216*b* that extends outwardly. In some embodiments, the slip inserts 215*a*, 215*b* may have a leading edge that protrudes from the surface of the slip at a distance in an amount in the range of from about 0.005 in to about 0.375 in, encompassing any value and subset therebetween. For example, the slip inserts 215*a*, 215*b* may have a leading edge that protrudes from the surface of the slip at a distance of about 0.005 in to about 0.075 in, or about 0.075 in to about 0.15 in, or about 0.15 in to about 0.225 in, or about 0.225 in to about 0.3 in, or about 0.3 in to about 0.375 in, encompassing any value and subset therebetween. Each of these distances is critical to the embodiments of the present disclosure and may depend on a number of factors including, but not limited to, the size of the slips, the size of the slip inserts, the diameter of the wellbore or casing into which the wellbore isolation device is to be set, and the like.

Each of slip inserts 215*a*, 215*b* protrude from the slips 216*a*, 216*b* respectively to penetrate or bite a downhole surface (e.g., a wellbore wall, a tubing string wall, such as casing string, and the like). Although each slip 216*a*, 216*b* is shown having two slip inserts 215*a*, 215*b* respectfully, it will be appreciated that any number of slip inserts, including one or a plurality (three, four, five, ten, twenty, and the like)

of slip inserts may be embedded in each slip, without departing from the scope of the present disclosure. Moreover, the number of slip inserts in the upper slips 216a and lower slips 216b, and any additional slips included as part of the wellbore isolation device 200, may have the same or different number of slip inserts, without departing from the scope of the present disclosure. One or more slip wedges 218 (shown as upper and lower slip wedges 218a and 218b, respectively) may also be positioned circumferentially about the mandrel 206. Collectively, the term "slip assembly" includes at least the slips and slip wedges. Slip inserts included in the slips may form a portion of the slip assembly but may be referred to separately herein where indicated, particularly with reference to materials forming the slip assembly comprising slips and slip wedges which may differ from the material forming the slip inserts.

The slip inserts 215a, 215b shown in FIG. 2 are depicted as rectangular or square in cross section. However, the shape of the slips may be cylindrically shaped, frustrum shaped, conical shaped, spheroid shaped, pyramid shaped, polyhedron shaped, octahedron shaped, cube shaped, prism shaped, hemispheroid shaped, cone shaped, tetrahedron shaped, cuboid shaped, and the like, and any combination thereof, without departing from the scope of the present disclosure. That is, the slip inserts may be partially one shape and partially one or more other shapes. In some embodiments, the slip inserts are preferably cylindrically shaped. A cylindrical shape allows for low-cost manufacturing and easy assembly. In some embodiments, depending on the slip inserts 215a, 215b have a transverse diameter of in the range of from about 0.125 inches (in) to about 0.75 in (equivalent to 0.3175 centimeters (cm) to 1.905 cm), encompassing any value and subset therebetween. For example, the slip inserts 215a, 215b may have a transverse diameter of about 0.125 in to about 0.25 in, or about 0.25 in to about 0.5 in, or about 0.5 in to about 0.75 in, encompassing any value and subset therebetween. As used herein, the term "transverse diameter" refers to a straight line passing from side to side through the center of the slip insert along the width (and not length, when applicable) thereof.

The slip inserts 215a, 215b may further have a length in the range of from about 0.10 in to about 1.0 in, encompassing any value and subset therebetween. For example, the slip inserts 215a, 215b may have a length of about 0.1 in to about 0.25 in, or about 0.25 in to about 0.5 in, or about 0.5 in to about 0.75 in, or about 0.75 in to about 1.0 in, encompassing any value and subset therebetween. As used herein, the term "length" means a measurement from end to end of the longest dimension of an object, regardless of the object's shape. Further, the slip inserts 215a, 215b may have a width in the range of from about 0.1 in to about 0.75 in, encompassing any value and subset therebetween. For example, the slip inserts 215a, 215b may have a width of about 0.1 in to about 0.25 in, or about 0.25 in to about 0.5 in, or about 0.5 in to about 0.75 in, encompassing any value and subset therebetween. As used herein, the term "width" means a measurement from end to end taken perpendicular to the length of an object, as defined herein, regardless of the object's shape. In some instances the length and the width of a slip insert 215a, 215b may be identical (e.g., for cuboid shaped slip inserts 215a, 215b), without departing from the scope of the present disclosure. Each of these values is critical to the embodiments of the present disclosure and may depend on a number of factors including, but not limited to, the size of the mandrel 206 (discussed below), the diameter of the wellbore or casing in which the wellbore isolation device 200 is to be set, the type of material forming the slip inserts 215a, 215b, and the like.

As depicted, the leading edge 217a, 217b (or the entire slip insert) may extend outwardly from the slips 216a, 216b respectively at a preselected angle relative to the outer surface of the slip. That is, the slip inserts 215a, 215b may be embedded in the slips 216a, 216b at a preselected angle. In some embodiments, the preselected angle may be in the range of from about 1° to about 45° relative to the surface of the slips 216a, 216b, encompassing any value and subset therebetween. For example, in some embodiments, the preselected angle may be about 1° to about 9°, or about 9° to about 18°, or about 18° to about 27°, or about 27° to about 36°, or about 36° to about 45° relative to the surface of the slips 216a, 216b, encompassing any value and subset therebetween. Each of these angles is critical to the embodiments of the present disclosure and may depend on a number of factors including, but not limited to, the size of the slips, the size of the slip inserts, the diameter of the wellbore or casing into which the wellbore isolation device is to be set, and the like.

With continued reference to FIG. 2, a packer assembly is shown consisting of one or more expandable or inflatable packer elements 220 disposed between the upper and lower slip wedges 218a, 218b and otherwise arranged about the mandrel 206. It will be appreciated that the particular packer assembly depicted in FIG. 2 is merely representative as there are several packer arrangements known and used within the art. For instance, while three packer elements 220 are shown in FIG. 2, the principles of the present disclosure are equally applicable to wellbore isolation devices that employ more or less than three packer elements 220, without departing from the scope of the disclosure.

A mule shoe 222 may be positioned at or otherwise secured to the mandrel 206 at its lower or distal end. As will be appreciated, the lower most portion of the wellbore isolation device 200 need not be a mule shoe 222, but could be any type of section that serves to terminate the structure of the wellbore isolation device 200, or otherwise serves as a connector for connecting the wellbore isolation device 200 to other tools, such as a valve, tubing, or other downhole equipment.

In some embodiments, a spring 224 may be arranged within a chamber 226 defined in the mandrel 206 and otherwise positioned coaxial with and fluidly coupled to the central flow passage 210. At one end, the spring 224 biases a shoulder 228 defined by the chamber 226 and at its opposing end the spring 224 engages and otherwise supports the frac ball 208. The ball cage 204 may define a plurality of ports 230 (three shown) that allow the flow of fluids therethrough, thereby allowing fluids to flow through the length of the wellbore isolation device 200 via the central flow passage 210.

As the wellbore isolation device 200 is lowered into the wellbore 106, the spring 224 prevents the frac ball 208 from engaging the ball seat 212. As a result, fluids may pass through the wellbore isolation device 200; i.e., through the ports 230 and the central flow passage 210. The ball cage 204 retains the frac ball 208 such that it is not lost during translation into the wellbore 106 to its target location. Once the wellbore isolation device 200 reaches the target location, a setting tool (not shown) of a type known in the art can be used to move the wellbore isolation device 200 from its unset position (shown in FIG. 2) to a set position. The setting tool may operate via various mechanisms to anchor the wellbore isolation device 200 in the wellbore 106 including, but not limited to, hydraulic setting, mechanical setting, setting by swelling, setting by inflation, and the like. In the set position, the slips 216a, 216b and the packer elements 220 expand and engage the inner walls of the casing 114.

When it is desired to seal the wellbore 106 at the target location with the wellbore isolation device 200, fluid is injected into the wellbore 106 and conveyed to the wellbore isolation device 200 at a predetermined flow rate that overcomes the spring force of the spring 224 and forces the frac ball 208 downwardly until it sealingly engages the ball seat 212. When the frac ball 208 is engaged with the ball seat 212 and the packer elements 220 are in their set position, fluid flow past or through the wellbore isolation device 200 in the downhole direction is effectively prevented. At that point, completion or stimulation operations may be undertaken by injecting a treatment or completion fluid into the wellbore 106 and forcing the treatment/completion fluid out of the wellbore 106 and into a subterranean formation above the wellbore isolation device 200.

Following completion and/or stimulation operations, the wellbore isolation device 200 must be removed from the wellbore 106 in order to allow production operations to effectively occur without being excessively hindered by the emplacement of the wellbore isolation device 200. According to the present disclosure, various components of the wellbore isolation device 200 may be made of one or more degradable materials. In particular, one or more elements of the slip assemblies may be composed of a degradable metal material. The degradable metal material may provide more time between setting the wellbore isolation device 200 and when a desired completion or stimulation operation is undertaken, such as a hydraulic fracturing operation. Moreover, the degradable metal material may allow for acid treatments and acidified stimulation of the wellbore 106.

In some instances, it may be desirable to increase the flow area or flow capacity through and/or around the wellbore isolation device 200. According to the present disclosure, the wellbore isolation device 200 may exhibit a large flow area or flow capacity through and/or around the wellbore isolation device 200 so that it does not unreasonably impede, obstruct, or inhibit production operations while the wellbore isolation device 200 degrades such that it no longer provides a seal. As a result, production operations may be undertaken while the wellbore isolation device 200 proceeds to dissolve and/or degrade, and without creating a significant pressure restriction within the wellbore 106.

The wellbore isolation device 200 may provide a minimum production flow area across the wellbore isolation device 200. As used herein "production flow area across" the wellbore isolation device 200 refers to any fluid flow through and/or around the wellbore isolation device 200. In some embodiments, the minimum production flow area across the wellbore isolation device 200 may be a desired fraction of the total flow area of the wellbore 106 (i.e., the casing 114) at the location of the wellbore isolation device 200. More particularly, in at least one embodiment, the wellbore isolation device 200 may exhibit a production flow area across the wellbore isolation device 200 that is at least $\frac{1}{25}$ the total flow area of the wellbore 106 (i.e., the casing 114) at the location of the wellbore isolation device 200. In another embodiment, the wellbore isolation device 200 may exhibit a production flow area across the wellbore isolation device 200 that is at least $\frac{1}{16}$ of the total flow area of the wellbore 106 at the location of the wellbore isolation device 200. The production flow area across the wellbore isolation device 200 may include any fluid flow through the central flow passage 210 and any other flow paths through or around the wellbore isolation device 200 that are not necessarily through the central flow passage 210. In some embodiments, for instance, the wellbore isolation device 200 may further include one or more conduits or flow channels 236 defined longitudinally through the mandrel 206 or other structural portions of the wellbore isolation device 200 through which fluids may flow during production operations.

In other embodiments, the minimum production flow area of the wellbore isolation device 200 may correspond to a desired ratio between the inner and outer diameters of the wellbore isolation device 200. The term "diameter" with reference to the minimum production flow area refers to the diameter of the cross-sectional area of the wellbore isolation device 200 or the hydraulic diameter of a flow path (or a combined flow area) through the wellbore isolation device 200. The "hydraulic diameter" is defined as four times the cross-sectional area divided by the wetted perimeter of the cross section. As illustrated, the wellbore isolation device 200 may exhibit an inner diameter 232 and an outer diameter 234. The inner diameter 232 may generally comprise the diameter of the central flow passage 210, and the outer diameter 234 may comprise the diameter of the wellbore isolation device 200 in the run-in or unexpanded configuration. In at least one embodiment, the inner diameter 232 of the wellbore isolation device 200 may be at least 17% (i.e., $\frac{1}{6}$) of the outer diameter 234 of the wellbore isolation device 200. In another embodiment, the inner diameter 232 of the wellbore isolation device 200 may be at least 25% (i.e., $\frac{1}{4}$) of the outer diameter 234 of the wellbore isolation device 200. The minimum 17% threshold may be calculated from the pressure drop across the wellbore isolation device 200 as a function of the flow rate through the central flow passage 210 in applications having multiple wellbore isolation devices positioned within the wellbore 106. Having the inner diameter 232 greater than 17% of the outer diameter 234 may increase the production flow area through the central flow passage 210 and thereby provide a lower pressure drop across the wellbore isolation device 200. The upper limit of the inner diameter 232 may be dependent on the structural limitations of the wellbore isolation device 200 and, more particularly, the structural limitations of the mandrel 206. For instance, the inner diameter 232 may be any diameter as long as the mandrel 206 remains able to adequately hold or maintain pressure loads that may be assumed during downhole operation.

In yet other embodiments, the minimum production flow area of the wellbore isolation device 200 may need to be larger than the aforementioned two options. With a larger number of wellbore isolation devices, with higher production flow rates, or with lower acceptable pressure drop, the minimum production flow area should be larger to achieve a lower pressure drop of the fluid across the wellbore isolation device 200. In these cases, the fraction of the total flow area should be larger, or the inner diameter 232 of the wellbore isolation device 200 should be a higher fraction of the outer diameter 234. For example, in at least one embodiment, a large number of wellbore isolation devices (e.g., greater than twenty-nine) may be required. In such embodiments, the minimum production flow area of the wellbore isolation device 200 may be achieved by having a production flow area through and/or around the wellbore isolation device 200 that is at least $\frac{1}{9}$ of the total flow area of the wellbore 106 (i.e., the casing 114) at the location of the wellbore isolation device 200, or where the inner diameter 232 of the wellbore isolation device 200 is at least 33% (i.e., $\frac{1}{3}$) of the outer diameter 234. In another embodiment, an even larger number of wellbore isolation devices (e.g., greater than forty-nine) may be required for a specific application. In such embodiments, the minimum production flow area of the wellbore isolation device 200 may be achieved by having a production flow area through and/or around the wellbore isolation device 200 that is at least ⅙ of the total flow area of the wellbore 106 at the location of the wellbore isolation device 200, or where the inner diameter 232 of the wellbore isolation device 200 is at least 41% of the outer diameter 234.

According to the present disclosure, at least one element of the slip assemblies described herein is composed of a degradable metal material that dissolves within a wellbore environment. Accordingly, each of the slips 216a, 216b and/or the slip wedges 218a, 218b may be made of a degradable metal material. The rate of degradation of the degradable metal material may depend on a number of factors including, but not limited to, the type of degradable metal material selected and the conditions of the wellbore environment. As used herein, a "degradable metal material" (also referred to simply as "degradable metal material" herein) may refer to the rate of dissolution of the degradable metal material, and the rate of dissolution may correspond to a rate of material loss at a particular temperature and within particular wellbore conditions. For instance, in at least one embodiment, a degradable metal material may comprise a material that exhibits a degradation rate in an amount in the range of from about 0.01 milligrams per square centimeters ($mg/cm^2$) to about 10 $mg/cm^2$ per hour at a temperature of 200° F. (93.3° C.) while exposed to a 15% potassium chloride (KCl) solution, encompassing any value and subset therebetween. For example, the degradation rate may be about 0.01 $mg/cm^2$ to about 2.5 $mg/cm^2$, or about 2.5 $mg/cm^2$ to about 5 $mg/cm^2$, or about 5 $mg/cm^2$ to about 7.5 $mg/cm^2$, or about 7.5 $mg/cm^2$ to about 10 $mg/cm^2$ per hour at a temperature of 200° F. (93.3° C.) while exposed to a 15% potassium chloride (KCl) solution, encompassing any value and subset therebetween. In other instances, a degradable metal material may comprise a material that loses about 0.1% to about 10% of its total mass per day at 200° F. (93.3° C.) in 15% KCl solution, encompassing any value and subset therebetween. For example, in some embodiments the degradable metal material may lose about 0.1% to about 2.5%, or about 2.5% to about 5%, or about 5% to about 7.5%, or about 7.5% to about 10% of its total mass per day at 200° F. (93.3° C.) in 15% KCl solution, encompassing any value and subset therebetween. Each of these values representing the degradable metal material is critical to the embodiments of the present disclosure and may depend on a number of factors including, but not limited to, the type of degradable metal material, the wellbore environment, and the like.

The degradation of the degradable metal material may be in the range of from about 2 hours to about 120 days, encompassing any value or subset therebetween. For example, the degradation of the degradable metal material may be about 2 hours to about 30 days, or about 30 days to about 60 days, or about 60 days to about 90 days, or about 90 days to about 120 days, encompassing any value and subset therebetween. Each of these values representing the degradable metal material is critical to the embodiments of the present disclosure and may depend on a number of factors including, but not limited to, the type of degradable metal material, the wellbore environment, and the like.

Suitable degradable metal materials that may be used in accordance with the embodiments of the present disclosure include galvanically-corrodible or degradable metals and metal alloys. Such metals and metal alloys may be configured to degrade via an electrochemical process in which the galvanically-corrodible metal corrodes in the presence of an electrolyte (e.g., brine or other salt-containing fluids present within the wellbore 106). As used herein, an "electrolyte" is any substance containing free ions (i.e., a positively or negatively charged atom or group of atoms) that make the substance electrically conductive. The electrolyte can be selected from the group consisting of, solutions of an acid, a base, a salt, and combinations thereof. A salt can be dissolved in water, for example, to create a salt solution. Common free ions in an electrolyte include, but are not limited to, sodium ($Na^+$), potassium ($K^+$), calcium ($Ca^{2+}$), magnesium ($Mg^{2+}$), chloride ($Cl^-$), bromide ($B^-$) hydrogen phosphate ($HPO_4^{2-}$), hydrogen carbonate ($HCO_3^-$), and any combination thereof. Preferably, the electrolyte contains chloride ions. The electrolyte can be a fluid that is introduced into the wellbore 106 or a fluid emanating from the wellbore 106, such as from a surrounding subterranean formation (e.g., the formation 108 of FIG. 1).

Suitable degradable metal materials include, but are not limited to, copper, copper alloys (e.g., brass, bronze, etc.), tin, tin alloys (e.g., pewter, solder, etc.), aluminum, aluminum alloys (e.g., alnico, magalium, etc.), iron, iron alloys (e.g., cast iron, pig iron, etc.), zinc, zinc alloys (e.g., zamak, and the like), magnesium, magnesium alloys (e.g., electron, magnox, etc.), beryllium, beryllium alloys (e.g., beryllium-copper alloys, beryllium-nickel alloys), and any combination thereof.

Suitable magnesium alloys include alloys having magnesium at a concentration in the range of from about 40% to about 99% by weight of the magnesium alloy, encompassing any value and subset therebetween. In some embodiments, the magnesium concentration may be in the range of about 40% to about 99%, 70% to about 98%, and preferably about 80% to about 95% by weight of the magnesium alloy, encompassing any value and subset therebetween. Each of these values is critical to the embodiments of the present disclosure and may depend on a number of factors including, but not limited to, the type of magnesium alloy, the desired degradability of the magnesium alloy, and the like.

Magnesium alloys comprise at least one other ingredient besides the magnesium. The other ingredients can be selected from one or more metals, one or more non-metals, or a combination thereof. Suitable metals that may be alloyed with magnesium include, but are not limited to, lithium, sodium, potassium, rubidium, cesium, beryllium, calcium, strontium, barium, aluminum, gallium, indium, tin, thallium, lead, bismuth, scandium, titanium, vanadium, chromium, manganese, iron, cobalt, nickel, copper, zinc, yttrium, zirconium, niobium, molybdenum, ruthenium, rhodium, palladium, praseodymium, silver, lanthanum, hafnium, tantalum, tungsten, terbium, rhenium, osmium, iridium, platinum, gold, neodymium, gadolinium, erbium, oxides of any of the foregoing, and any combinations thereof.

Suitable non-metals that may be alloyed with magnesium include, but are not limited to, graphite, carbon, silicon, boron nitride, and combinations thereof. The carbon can be in the form of carbon particles, fibers, nanotubes, fullerenes, and any combination thereof. The graphite can be in the form of particles, fibers, graphene, and any combination thereof. The magnesium and its alloyed ingredient(s) may be in a solid solution and not in a partial solution or a compound where inter-granular inclusions may be present. In some embodiments, the magnesium and its alloyed ingredient(s) may be uniformly distributed throughout the magnesium alloy but, as will be appreciated, some minor variations in the distribution of particles of the magnesium and its alloyed ingredient(s) can occur. In other embodiments, the magnesium alloy is a sintered construction.

In some embodiments, the magnesium alloy may have a yield stress in the range of from about 20000 pounds per square inch (psi) to about 50000 psi, encompassing any value and subset therebetween. For example, in some embodiments, the magnesium alloy may have a yield stress of about 20000 psi to about 30000 psi, or about 30000 psi to about 40000 psi, or about 40000 psi to about 50000 psi, encompassing any value and subset therebetween.

Suitable aluminum alloys include alloys having aluminum at a concentration in the range of from about 40% to about 99% by weight of the aluminum alloy, encompassing any value and subset therebetween. For example, suitable magnesium alloys may have aluminum concentrations of about 40% to about 50%, or about 50% to about 60%, or about 60% to about 70%, or about 70% to about 80%, or about 80% to about 90%, or about 90% to about 99% by weight of the aluminum alloy, encompassing any value and subset therebetween. Each of these values is critical to the embodiments of the present disclosure and may depend on a number of factors including, but not limited to, the type of aluminum alloy, the desired degradability of the aluminum alloy, and the like.

The aluminum alloys may be wrought or cast aluminum alloys and comprise at least one other ingredient besides the aluminum. The other ingredients can be selected from one or more any of the metals, non-metals, and combinations thereof described above with reference to magnesium alloys, with the addition of the aluminum alloys additionally being able to comprise magnesium.

Suitable degradable metal materials for use in the embodiments described herein also include micro-galvanic metals or materials, such as solution-structured galvanic materials. An example of a solution-structured galvanic material is a magnesium alloy containing zinc (Zn), where different domains within the alloy contain different percentages of Zn. This leads to a galvanic coupling between these different domains, which causes micro-galvanic corrosion and degradation. Micro-galvanically corrodible magnesium alloys could also be solution structured with other elements such as zinc, aluminum, manganese, nickel, cobalt, calcium, iron, carbon, tin, silver, copper, titanium, rare earth elements, etc. Examples of solution-structured micro-galvanically-corrodible magnesium alloys include ZK60, which includes 4.5% to 6.5% zinc, minimum 0.425% zirconium, 0% to 1% other, and balance magnesium; AZ80, which includes 7.5% to 9.5% aluminum, 0.2% to 0.8% zinc, 0.12% manganese, 0.015% other, and balance magnesium; and AZ31, which includes 2.5% to 3.5% aluminum, 0.5% to 1.5% zinc, 0.2% manganese, 0.15% other, and the balance magnesium. Each of these examples is % by weight of the metal alloy. In some embodiments, "other" may include unknown materials, impurities, additives, and any combination thereof.

In some embodiments, the degradable metal material forming at least a component of a slip assembly may comprise dissimilar metals that generate a galvanic coupling that either accelerates or decelerates the degradation rate of the slips 216a, 216b themselves, or of another component of the wellbore isolation device 200 that is composed at least partially of a degradable material, which may be a degradable metal material or a degradable non-metal material, as discussed in detail below. In some instances, such embodiments may depend on where the dissimilar metals lie on the galvanic series. In at least one embodiment, a galvanic coupling may be generated by embedding or attaching a cathodic substance or piece of material into an anodic component. For instance, the galvanic coupling may be generated by dissolving aluminum in gallium. A galvanic coupling may also be generated by using a sacrificial anode coupled to the degradable material. In such embodiments, the degradation rate of the degradable metal material may be decelerated until the sacrificial anode is dissolved or otherwise corroded away. As an example, the mandrel 206 may be a more electronegative material than the slip wedges 218a, 218b or the slips 216a, 216b. In such an embodiment, the galvanic coupling between the mandrel 206 and the slip wedges 218a, 218b and/or the slips 216a, 216b may cause the mandrel 206 to act as an anode and degrade before the slip wedges 218a, 218b and/or the slips 216a, 216b. Once the mandrel 206 has degraded, the slip wedges 218a, 218b and/or the slips 216a, 216b would degrade independently.

In some embodiments, the density of the component of the wellbore isolation device 200 composed of a degradable metal material (e.g., one or more elements of the slip assembly), as described herein, may exhibit a density that is relatively low. The low density may prove advantageous in ensuring that the wellbore isolation device 200 may be placed in extended-reach wellbores, such as extended-reach lateral wellbores. As will be appreciated, the more components of the wellbore isolation device composed of the degradable metal material having a low density, the lesser the density of the wellbore isolation device 200 as a whole. In some embodiments, the degradable metal material is a magnesium alloy or an aluminum alloy and may have a density less than 3 $g/cm^3$ or less than 2 $g/cm^3$. In other embodiments where the degradable metal material is a material that is lighter than steel, the density of the may be less than 5 $g/cm^3$. By way of example, the inclusion of lithium in a magnesium alloy can reduce the density of the alloy.

The slip inserts 215a, 215b embedded into the slips 216a, 216b may be composed of a material that has a compressive strength that is greater than the compressive strength of a casing string used in the wellbore. In some embodiments, the slip inserts 215a, 215b may be composed of a material that has a compressive strength of greater than about 120,000 psi. While no maximum compressive strength is required, as the slip inserts 215a, 215b must merely be capable of biting into a downhole surface, such as a casing string or the wellbore wall, the compressive strength of the slip inserts 215a, 215b is generally not greater than about 1,000,000 psi. Accordingly, in some embodiments, the slip inserts 215a, 215b are composed of a material having a compressive strength in the range of from about 190,000 psi to about 800,000 psi, encompassing any value and subset therebetween. Each of these values is critical to the components of the present disclosure and may depend on a number of factors including, but not limited to, the surface into which the slip inserts are biting into, and the like.

Accordingly, the slip inserts 215a, 215b may be any material that exhibits the requisite compressive strength. In some embodiments, such materials include hardened metals, ceramics, and any combination thereof. The material forming the slip inserts may be an oxide or a non-oxide material. In some instances, the thickness of a material may be increased in order to achieve the desired compressive strength. For example, in some embodiments the material forming the slip insert 215a, 215b may include, but are not limited to, iron (e.g., cast iron), steel, titanium, zircon, a carbide (e.g., tungsten carbide, a tungsten carbide alloy (e.g., alloyed with cobalt), silicon carbide, titanium carbide, boron carbide, tantalum carbide), a boride (e.g., osmium diboride, rhenium boride, tungsten boride, zirconium boride, iron tetraboride), a nitride (e.g., silicon nitride, titanium nitride, boron nitride, cubic boron nitride, boron carbon nitride, beta carbon nitride), diamond, synthetic diamond, silica (e.g., amorphous silica), an oxide (e.g., aluminum oxide, fused aluminum oxide, zirconium oxide, beryllium oxide, alumina-chrome oxide), corundite, topaz, synthetic topaz, garnet, synthetic garnet, lonsdaleite, and any combination thereof.

In some embodiments, the density of the slip inserts 215a, 215b may have a density in the range of from about 2 grams per cubic centimeter (g/cm$^3$) to about 17 g/cm$^3$, encompassing any value and subset therebetween. For example, the density of the slip inserts 215a, 215b may be about 2 g/cm$^3$ to about 5 g/cm$^3$, or about 5 g/cm$^3$ to about 8 g/cm$^3$, or about 8 g/cm$^3$ to about 11 g/cm$^3$, or about 11 g/cm$^3$ to about 14 g/cm$^3$, or about 14 g/cm$^3$, to about 17 g/cm$^3$, encompassing any value and subset therebetween. Each of these values is critical to the embodiments of the present disclosure and may depend on a number of factors including, but not limited to, the desired density of the slip inserts, the material selected for forming the slip inserts, the operation in which the downhole tool comprising the slip inserts is used, and the like.

At least another portion of the wellbore isolation device 200 aside from a component of the slip assembly is also degradable. For example, the mandrel 206 of the wellbore isolation device 200 may be made of or otherwise comprise a degradable material configured to degrade within the wellbore environment. In other embodiments, other components of the wellbore isolation device 200 may be made of or otherwise comprise a degradable material including, but not limited to, the frac ball 208, the packer elements 220, the mule shoe 222, the ball cage 204, or any other component described herein or forming part of a wellbore isolation device 200 or downhole tool 100 (FIG. 1). For example, such components may include, but are not limited to, a spacer ring, a slip, a slip wedge, a retainer ring, an extrusion limiter or backup shoe, a mule shoe, a ball, a ball seat, a sleeve, a perforation gun housing, a sealing element, a slip block (e.g., to prevent sliding sleeves from translating), a housing, a release mechanism, a pumpdown device, a coupling, a connector, a support, an enclosure, a cage, a slip body, a tapered shoe, extrusion limiters, shear pins, or any combination thereof. The foregoing structural elements or components of the wellbore isolation device 200 are collectively referred to herein as "the components" in the following discussion.

The degradable material forming any portion or component of the wellbore isolation device 200 may be a degradable metal material, as described above. That is, the portion or component of the wellbore isolation device 200 may be of any of the degradable metal materials described above and have any of the qualities (e.g., density, and the like) described above, without departing from the scope of the present disclosure. In other embodiments, the portion or component of the wellbore isolation device 200 may be a degradable non-metal material. Such degradable non-metal materials may include, but are not limited to, a polyurethane rubber; a polyester-based polyurethane rubber; a polyether-based polyurethane rubber; a thiol-based polymer; a hyaluronic acid rubber; a polyhydroxobutyrate rubber; a polyester elastomer; a polyester amide elastomer; a starch-based resin (e.g., starch-poly(ethylene-co-vinyl alcohol), a starch-polyvinyl alcohol, a starch-polylactic acid, starch-polycaprolactone, starch-poly(butylene succinate), and the like); a polyethylene terephthalate polymer; a polyester thermoplastic (e.g., polyether/ester copolymers, polyester/ester copolymers, and the like); a polysaccharide; chitin; chitosan; a protein; an aliphatic polyester; poly(c-caprolactone); a poly(hydroxybutyrate); poly(ethyleneoxide); poly (phenyllactide); a poly(amino acid); a poly(orthoester); polyphosphazene; a polylactide; a polyglycolide; a poly (anhydride) (e.g., poly(adipic anhydride), poly(suberic anhydride), poly(sebacic anhydride), poly(dodecanedioic anhydride), poly(maleic anhydride), and poly(benzoic anhydride), and the like); a polyepichlorohydrin; a copolymer of ethylene oxide/polyepichlorohydrin; a terpolymer of epichlorohydrin/ethylene oxide/allyl glycidyl ether; and any combination thereof. Copolymers and terpolymers of the foregoing may also be suitable.

The selection of degradable metal material or degradable non-metal material may depend on a number of factors including, but not limited to, the particular portion or component of the wellbore isolation device 200. For example, the mandrel may be desirably rigid, whereas the packer element 220 may be desirably resilient (i.e., elastic). Accordingly, the selection of materials forming these elements may differ.

In some embodiments, the degradable material may be at least partially encapsulated in a second material or "sheath" disposed on all or a portion of a given component, including the slip assembly, of the wellbore isolation device 200. The sheath may be configured to help prolong degradation of the given component of the wellbore isolation device 200. The sheath may also serve to protect the component from abrasion within the wellbore 106. The sheath may be permeable, frangible, or comprise a material that is at least partially removable at a desired rate within the wellbore environment. In either scenario, the sheath may be designed such that it does not interfere with the ability of the wellbore isolation device 200 to form a fluid seal in the wellbore 106 or to otherwise perform its functional operations.

The sheath may comprise any material capable of use in a downhole environment and, depending on the component that the sheath encapsulates, the sheath may or may not be elastic such that it is able to expand with a corresponding expansion of the component. For instance, a frangible sheath may break as the packer elements 220 expand to form a fluid seal, whereas a permeable sheath may remain in place on the packer elements 220 as they form the fluid seal. As used herein, the term "permeable" refers to a structure that permits fluids (including liquids and gases) therethrough and is not limited to any particular configuration. In other embodiments, the sheath may be frangible such that as a component is moved, such if the sheath surrounds at least a portion or all of the slips 216a, 216b, as the slips 216a, 216 expanded outwardly the sheath breaks from the slips 216a, 216b.

The sheath may comprise any of the afore-mentioned degradable materials (including metal or non-metal). In some embodiments, the sheath may be made of a degradable material that degrades at a rate that is faster than that of the underlying degradable material that forms the component. Other suitable materials for the sheath include, but are not limited to, a TEFLON® coating, a wax, a drying oil, a polyurethane, an epoxy, a cross-linked partially hydrolyzed polyacrylic, a silicate material, a glass, an inorganic durable material, a polymer, polylactic acid, polyvinyl alcohol, polyvinylidene chloride, a hydrophobic coating, paint, and any combination thereof.

In some embodiments, all or a portion of the outer surface of a given component of the wellbore isolation device 200 may be treated to impede degradation. For example, the outer surface of a given component may undergo a treatment that aids in preventing the degradable metal material from galvanically-corroding or a degradable non-metal material from hydrolytically degrading. Suitable treatments may include, but are not limited to, an anodizing treatment, an oxidation treatment, a chromate conversion treatment, a dichromate treatment, a fluoride anodizing treatment, a hard anodizing treatment, and any combination thereof. Some anodizing treatments may result in an anodized layer of material being deposited on the outer surface of a given component. The anodized layer may comprise materials such as, but not limited to, ceramics, metals, polymers, epoxies, elastomers, or any combination thereof and may be applied using any suitable processes known to those of skill in the art. Examples of suitable processes that result in an anodized layer include, but are not limited to, soft anodized coating, anodized coating, electroless nickel plating, hard anodized coating, ceramic coatings, carbide beads coating, plastic coating, thermal spray coating, high velocity oxygen fuel (HVOF) coating, a nano HVOF coating, a metallic coating.

In some embodiments, all or a portion of the outer surface of a given component of the wellbore isolation device 200 may be treated or coated with a substance configured to enhance degradation of the degradable material. For example, such a treatment or coating may be configured to remove a protective coating or treatment or otherwise accelerate the degradation of the degradable material of the given component. An example is a galvanically-corroding metal coated with a layer of polyglycolic acid (PGA). In this example, the PGA would undergo hydrolysis and cause the surrounding fluid to become more acidic, which would accelerate the degradation of the underlying metal.

While the foregoing description and embodiments are directed primarily to a degradable or disappearing frac plug, those skilled in the art will readily recognize that the principles of the present disclosure could equally be applied to any traditional wellbore isolation device having slip assemblies including, but not limited to, a bridge plug, a wellbore packer, or any combination thereof. Moreover, while the foregoing description and embodiments are directed primarily to setting wellbore isolation devices within a casing 114 (FIGS. 1 and 2), the principles of the present disclosure are equally applicable to open hole applications.

Embodiments disclosed herein include Embodiment A, Embodiment B, and Embodiment C:

Embodiment A: A downhole tool comprising: a wellbore isolation device that provides a plurality of components including a mandrel, and a slip assembly comprising a plurality of slip elements including a slip wedge and a slip, wherein an element of the slip assembly is composed of a degradable metal material, and wherein the slip comprises a slip insert embedded therein, the slip insert having a compressive strength of greater than about 120,000 psi.

Embodiment B: A method comprising: introducing a downhole tool into a wellbore, wherein the downhole tool is a wellbore isolation device that provides a plurality of components including a mandrel, and a slip assembly comprising a plurality of slip elements including a slip wedge and a slip, wherein an element of the slip assembly is composed of a degradable metal material, and wherein the slip comprises a slip insert embedded therein, the slip insert having a compressive strength of greater than about 120,000 psi; anchoring the downhole tool within the wellbore at a target location; performing at least one downhole operation; and degrading at least the element of the slip assembly composed of the degradable metal material upon exposure to a wellbore environment.

Embodiment C: A system comprising: a conveyance connected to a service rig and extending through a surface into a wellbore in a subterranean formation; and a downhole tool connected to the conveyance and placed in the wellbore, wherein the downhole tool is a wellbore isolation device that provides a plurality of components including a mandrel, and a slip assembly comprising a plurality of slip elements including a slip wedge and a slip, wherein an element of the slip assembly is composed of a degradable metal material, and wherein the slip comprises a slip insert embedded therein, the slip insert having a compressive strength of greater than about 120,000 psi.

Each of Embodiments A, B, and C may have one or more of the following additional elements in any combination:

Element 1: Wherein the wellbore isolation device is selected from the group consisting of a frac plug, a wellbore packer, a deployable baffle, a bridge plug, and any combination thereof.

Element 2: Wherein the degradable metal material forming the slip assembly is selected from the group consisting of copper, a copper alloy, tin, a tin alloy, aluminum, an aluminum alloy, iron, an iron alloy, zinc, a zinc alloy, magnesium, a magnesium alloy, beryllium, a beryllium alloy, and any combination thereof.

Element 3: Wherein the slip insert is composed of a material selected from the group consisting of a hardened metal, a ceramic, and any combination thereof.

Element 4: Wherein the slip insert is composed of a material selected from the group consisting of iron, steel, titanium, zircon, a carbide, a boride, a nitride, diamond, synthetic diamond, silica, an oxide, corundite, topaz, synthetic topaz, garnet, synthetic garnet, lonsdaleite, and any combination thereof.

Element 5: Wherein the slip insert is embedded in the slip such that its structure is about 10% to about 95% below a surface of the slip.

Element 6: Wherein the compressive strength of the slip insert is of from about 190,000 psi to about 800,000 psi.

Element 7: Wherein the slip insert has a shape selected from the group consisting of cylindrically shaped, frustrum shaped, conical shaped, spheroid shaped, pyramid shaped, polyhedron shaped, octahedron shaped, cube shaped, prism shaped, hemispheroid shaped, cone shaped, tetrahedron shaped, cuboid shaped, and any combination thereof.

Element 8: Wherein the slip insert has a transverse diameter in the range of from about 0.125 inches to about 0.75 inches.

Element 9: Wherein the slip insert has a length of from about 0.1 inches to about 1.0 inch and/or a width of from about 0.1 inches to about 0.75 inches.

Element 10: Wherein the slip insert has a leading edge that protrudes from a surface of the slip at a distance of from about 0.005 inches to about 0.375 inches.

Element 11: Wherein the slip insert is embedded in the slip at a preselected angle of from about 1° to about 45°.

Element 12: Wherein the slip insert has a density of from about 2 g/cm$^3$ to about 17 g/cm$^3$.

Element 13: Wherein the mandrel defines a central flow passage that allows fluid flow in at least one direction through the wellbore isolation device, the wellbore isolation device providing an inner diameter and an outer diameter, and wherein a minimum production flow area is provided across the wellbore isolation device and is selected from the group consisting of: a first flow area across the wellbore isolation device of at least ½₅ a total flow area of a casing at a location of the wellbore isolation device within a wellbore, a second flow area resulting from the inner diameter being at least 17% of the outer diameter, and any combination thereof.

Element 14: Wherein the mandrel defines a central flow passage that allows fluid flow in at least one direction through the wellbore isolation device, the wellbore isolation device providing an inner diameter and an outer diameter, and wherein a minimum production flow area is provided across the wellbore isolation device and is selected from the group consisting of: a first flow area across the wellbore isolation device of at least ½₅ a total flow area of a casing at a location of the wellbore isolation device within a wellbore, a second flow area resulting from the inner diameter being at least 17% of the outer diameter, and any combination thereof, and wherein the flow area across the wellbore isolation device includes any fluid flow area through the central flow passage and through any other flow paths through or around the wellbore isolation device.

Element 15: Wherein the mandrel defines a central flow passage that allows fluid flow in at least one direction through the wellbore isolation device, the wellbore isolation device providing an inner diameter and an outer diameter, and wherein a minimum production flow area is provided across the wellbore isolation device and is selected from the group consisting of: a first flow area across the wellbore isolation device of at least ½₅ a total flow area of a casing at a location of the wellbore isolation device within a wellbore, a second flow area resulting from the inner diameter being at least 17% of the outer diameter, and any combination thereof, wherein the flow area across the wellbore isolation device includes any fluid flow area through the central flow passage and through any other flow paths through or around the wellbore isolation device, and wherein the other flow paths comprise at least one flow channel defined longitudinally through the mandrel through which fluids may flow.

Element 16: Wherein the mandrel defines a central flow passage that allows fluid flow in at least one direction through the wellbore isolation device, the wellbore isolation device providing an inner diameter and an outer diameter, and wherein a minimum production flow area is provided across the wellbore isolation device and is selected from the group consisting of: a first flow area across the wellbore isolation device of at least ½₅ a total flow area of a casing at a location of the wellbore isolation device within a wellbore, a second flow area resulting from the inner diameter being at least 17% of the outer diameter, and any combination thereof, and wherein the inner diameter comprises a diameter of the central flow passage, and the outer diameter comprises a diameter of the wellbore isolation device in an unexpanded configuration.

Element 17: Wherein the mandrel defines a central flow passage that allows fluid flow in at least one direction through the wellbore isolation device, the wellbore isolation device providing an inner diameter and an outer diameter, and wherein a minimum production flow area is provided across the wellbore isolation device and is selected from the group consisting of: a first flow area across the wellbore isolation device of at least ½₅ a total flow area of a casing at a location of the wellbore isolation device within a wellbore, a second flow area resulting from the inner diameter being at least 17% of the outer diameter, and any combination thereof, and wherein first flow area across the wellbore isolation device is at least ⅛ of the total flow area of the casing at the location of the wellbore isolation device within the wellbore and the second flow area results from the inner diameter being at least 33% of the outer diameter.

By way of non-limiting example, exemplary combinations applicable to Embodiments A, B, and C include: 1, 4, 8, and 17; 10, 11, and 15; 1, 2, 3, 4, 5, 6, 7, 8, 9, 10, 11, 12, 13, 14, 15, 16, and 17; 3, 6, 9, 15, and 16; 2, 5, 7, and 9; 12, 13, 14, and 17; and the like.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A downhole tool comprising:
   a wellbore isolation device that provides a plurality of components including a mandrel, and a slip assembly comprising a plurality of slip elements including a slip wedge and a slip,
      wherein the mandrel forms a galvanic couple with the slip assembly, wherein the mandrel is an anodic element of the galvanic couple and the slip wedge and/or the slip is a cathodic element of the galvanic couple,
      wherein the slip comprises a slip insert embedded therein, the slip insert having a compressive strength of greater than about 120,000 psi, and
      wherein the slip insert is embedded in the slip such that its structure is about 10% to about 95% below a surface of the slip.

2. The downhole tool of claim 1, wherein the wellbore isolation device is selected from the group consisting of a frac plug, a wellbore packer, a deployable baffle, a bridge plug, and any combination thereof.

3. The downhole tool of claim 1, wherein the degradable metal material forming the slip assembly is selected from the group consisting of copper, a copper alloy, tin, a tin alloy, aluminum, an aluminum alloy, iron, an iron alloy, zinc, a zinc alloy, magnesium, a magnesium alloy, beryllium, a beryllium alloy, and any combination thereof.

4. The downhole tool of claim 1, wherein the slip insert is composed of a material selected from the group consisting of a hardened metal, a ceramic, and any combination thereof.

5. The downhole tool of claim 1, wherein the slip insert is composed of a material selected from the group consisting of iron, steel, titanium, zircon, a carbide, a boride, a nitride, diamond, synthetic diamond, silica, an oxide, corundite, topaz, synthetic topaz, garnet, synthetic garnet, lonsdaleite, and any combination thereof.

6. The downhole tool of claim 1, wherein the compressive strength of the slip insert is of from about 190,000 psi to about 800,000 psi.

7. The downhole tool of claim 1, wherein the slip insert has a shape selected from the group consisting of cylindrically shaped, frustrum shaped, conical shaped, spheroid shaped, pyramid shaped, polyhedron shaped, octahedron shaped, cube shaped, prism shaped, hemispheroid shaped, cone shaped, tetrahedron shaped, cuboid shaped, and any combination thereof.

8. The downhole tool of claim 1, wherein the slip insert has a transverse diameter in the range of from about 0.125 inches to about 0.75 inches.

9. The downhole tool of claim 1, wherein the slip insert has a length of from about 0.1 inches to about 1.0 inch and/or a width of from about 0.1 inches to about 0.75 inches.

10. The downhole tool of claim 1, wherein the slip insert has a leading edge that protrudes from a surface of the slip at a distance of from about 0.005 inches to about 0.375 inches.

11. The downhole tool of claim 1, wherein the slip insert is embedded in the slip at a preselected angle of from about 1° to about 45°.

12. The downhole tool of claim 1, wherein the slip insert has a density of from about 2 g/cm3 to about 17 g/cm3.

13. The downhole tool of claim 1, wherein the mandrel defines a central flow passage that allows fluid flow in at least one direction through the wellbore isolation device, the wellbore isolation device providing an inner diameter and an outer diameter, and wherein a minimum production flow area is provided across the wellbore isolation device and is selected from the group consisting of:
a first flow area across the wellbore isolation device of at least 1/25 a total flow area of a casing at a location of the wellbore isolation device within a wellbore,
a second flow area resulting from the inner diameter being at least 17% of the outer diameter,
and any combination thereof.

14. The downhole tool of claim 13, wherein the flow area across the wellbore isolation device includes any fluid flow area through the central flow passage and through any other flow paths through or around the wellbore isolation device.

15. The downhole tool of claim 14, wherein the other flow paths comprise at least one flow channel defined longitudinally through the mandrel through which fluids may flow.

16. The downhole tool of claim 13, wherein the inner diameter comprises a diameter of the central flow passage, and the outer diameter comprises a diameter of the wellbore isolation device in an unexpanded configuration.

17. The downhole tool of claim 13, wherein first flow area across the wellbore isolation device is at least 1/9 of the total flow area of the casing at the location of the wellbore isolation device within the wellbore and the second flow area results from the inner diameter being at least 33% of the outer diameter.

18. A method comprising:
introducing a downhole tool into a wellbore, wherein the downhole tool is a wellbore isolation device that provides a plurality of components including a mandrel, and a slip assembly comprising a plurality of slip elements including a slip wedge and a slip,
wherein the mandrel forms a galvanic couple with the slip assembly, wherein the mandrel is an anodic element of the galvanic couple and the slip wedge and/or the slip is a cathodic element of the galvanic couple, and
wherein the slip comprises a slip insert embedded therein, the slip insert having a compressive strength of greater than about 120,000 psi; wherein the slip insert is embedded in the slip such that its structure is about 10% to about 95% below a surface of the slip;
anchoring the downhole tool within the wellbore at a target location;
performing at least one downhole operation; and
degrading at least the element of the slip assembly composed of the degradable metal material upon exposure to a wellbore environment.

19. The method of claim 18, wherein the wellbore isolation device is selected from the group consisting of a frac plug, a wellbore packer, a deployable baffle, a bridge plug, and any combination thereof.

20. The method of claim 18, wherein the degradable metal material forming the slip assembly is selected from the group consisting of copper, a copper alloy, tin, a tin alloy, aluminum, an aluminum alloy, iron, an iron alloy, zinc, a zinc alloy, magnesium, a magnesium alloy, beryllium, a beryllium alloy, and any combination thereof.

21. The method of claim 18, wherein the slip insert is composed of a material selected from the group consisting of a hardened metal, a ceramic, and any combination thereof.

22. The method of claim 18, wherein the slip insert is composed of a material selected from the group consisting of iron, steel, titanium, zircon, a carbide, a boride, a nitride, diamond, synthetic diamond, silica, an oxide, corundite, topaz, synthetic topaz, garnet, synthetic garnet, lonsdaleite, and any combination thereof.

23. The method of claim 18, wherein the compressive strength of the slip insert is of from about 190,000 psi to about 800,000 psi.

24. The method of claim 18, wherein the slip insert has a shape selected from the group consisting of cylindrically shaped, frustrum shaped, conical shaped, spheroid shaped, pyramid shaped, polyhedron shaped, octahedron shaped, cube shaped, prism shaped, hemispheroid shaped, cone shaped, tetrahedron shaped, cuboid shaped, and any combination thereof.

25. The method of claim 18, wherein the slip insert has a transverse diameter in the range of from about 0.125 inches to about 0.75 inches.

26. The method of claim 18, wherein the slip insert has a length of from about 0.1 inches to about 1.0 inch and/or a width of from about 0.1 inches to about 0.75 inches.

27. The method of claim 18, wherein the slip insert has a leading edge that protrudes from a surface of the slip at a distance of from about 0.005 inches to about 0.375 inches.

28. The method of claim 18, wherein the slip insert is embedded in the slip at a preselected angle of from about 1° to about 45°.

29. The method of claim 18, wherein the slip insert has a density of from about 2 g/cm3 to about 17 g/cm3.

30. A system comprising:
a conveyance connected to a service rig and extending through a surface into a wellbore in a subterranean formation; and
a downhole tool connected to the conveyance and placed in the wellbore, wherein the downhole tool is a wellbore isolation device that provides a plurality of components including a mandrel, and a slip assembly comprising a plurality of slip elements including a slip wedge and a slip,
wherein the mandrel forms a galvanic couple with the slip assembly, wherein the mandrel is an anodic element of the galvanic couple and the slip wedge and/or the slip is a cathodic element of the galvanic couple, and
wherein the slip comprises a slip insert embedded therein, the slip insert having a compressive strength of greater than about 120,000 psi, wherein the slip insert is embedded in the slip such that its structure is about 10% to about 95% below a surface of the slip.

31. The system of claim 30, wherein the wellbore isolation device is selected from the group consisting of a frac plug, a wellbore packer, a deployable baffle, a bridge plug, and any combination thereof.

32. The system of claim 30, wherein the degradable metal material forming the slip assembly is selected from the group consisting of copper, a copper alloy, tin, a tin alloy, aluminum, an aluminum alloy, iron, an iron alloy, zinc, a zinc alloy, magnesium, a magnesium alloy, beryllium, a beryllium alloy, and any combination thereof.

33. The system of claim 30, wherein the slip insert is composed of a material selected from the group consisting of a hardened metal, a ceramic, and any combination thereof.

34. The system of claim 30, wherein the slip insert is composed of a material selected from the group consisting of iron, steel, titanium, zircon, a carbide, a boride, a nitride, diamond, synthetic diamond, silica, an oxide, corundite, topaz, synthetic topaz, garnet, synthetic garnet, lonsdaleite, and any combination thereof.

35. The system of claim 30, wherein the compressive strength of the slip insert is of from about 190,000 psi to about 800,000 psi.

36. The system of claim 30, wherein the slip insert has a shape selected from the group consisting of cylindrically shaped, frustrum shaped, conical shaped, spheroid shaped, pyramid shaped, polyhedron shaped, octahedron shaped, cube shaped, prism shaped, hemispheroid shaped, cone shaped, tetrahedron shaped, cuboid shaped, and any combination thereof.

37. The system of claim 30, wherein the slip insert has a transverse diameter in the range of from about 0.125 inches to about 0.75 inches.

38. The system of claim 30, wherein the slip insert has a length of from about 0.1 inches to about 1.0 inch and/or a width of from about 0.1 inches to about 0.75 inches.

39. The system of claim 30, wherein the slip insert has a leading edge that protrudes from a surface of the slip at a distance of from about 0.005 inches to about 0.375 inches.

40. The system of claim 30, wherein the slip insert is embedded in the slip at a preselected angle of from about 1° to about 45°.

41. The system of claim 30, wherein the slip insert has a density of from about 2 g/cm3 to about 17 g/cm3.

\* \* \* \* \*